United States Patent [19]

Breeden et al.

[11] Patent Number: 4,718,109

[45] Date of Patent: Jan. 5, 1988

[54] AUTOMATIC SYNCHRONIZATION SYSTEM

[75] Inventors: Robert L. Breeden, Boynton Beach; William V. Braun, Pompano Beach, both of Fla.

[73] Assignee: Motorola, Inc., Schaumburg, Ill.

[21] Appl. No.: 815,473

[22] Filed: Mar. 6, 1986

[51] Int. Cl.[4] .......................... H04B 1/00; H04B 7/00

[52] U.S. Cl. ........................................ 455/51; 455/56; 340/825.44; 375/107

[58] Field of Search ........................ 455/18, 51, 56, 33; 340/825.44, 825.5; 370/108, 103; 375/107

[56] References Cited

U.S. PATENT DOCUMENTS

| | | | |
|---|---|---|---|
| 4,188,582 | 2/1980 | Cannalte et al. | 455/51 |
| 4,208,630 | 6/1980 | Martinez | 455/51 |
| 4,255,814 | 3/1981 | Osborn | 455/51 |
| 4,506,384 | 3/1985 | Lucas | 455/51 |
| 4,578,815 | 3/1986 | Persinotti | 455/51 |

*Primary Examiner*—Jin F. Ng

*Attorney, Agent, or Firm*—Winfield J. Brown, Jr.; Joseph T. Downey; Anthony J. Sarli, Jr.

[57] ABSTRACT

An improved synchronization system for use with simulcast transmission systems is described. The invention provides a method and means for keeping the information signals for adjacent transmitters in the system in synchronization. This invention utilizes a centrally located master transmitter and control unit and a plurality of secondary transmitters disposed in an annular fashion around the master transmitter. In operation, the innermost annular band is synchronized to the master transmitter, while the remainder of the system is disabled. The next adjacent annular band is then synchronized to the innermost annular ring. The process is repeated until every annular band in the system is synchronized.

12 Claims, 7 Drawing Figures

AUTOMATIC SYNCHRONIZATION SYSTEM

BACKGROUND OF THE INVENTION

This invention pertains to the radio communication art and, more particularly, to a system which automatically maintains a uniform delay for simultaneous broadcast of information or message signals by a plurality of base station sites.

Simultaneous broadcast, or simulcast, systems are well known in the radio transmission art. In such systems, a plurality of remotely sited base stations simultaneously broadcast identical audio, or data message signals at a particular carrier frequency. By having one base station for each zone, which is part of a geographical area, maximum signal coverage for the given geographical area is provided. A problem with such systems occurs, however, when a radio receiver happens to be positioned between two transmitting sites such that it receives a nearly equal strength carrier signal from each. In this situation, it is important that the message signal from the two transmitters be synchronized in time, otherwise message signal intelligibility may be lost.

Known prior art systems generally have dealt with the problem of different time delays ($t_1$. $t_2$, . . . $t_N$) by utilizing fixed time delays at the central controller to provide a uniform delay to each base station. These fixed delays are preset at the time of equipment installation and alignment, adding a long, fixed time delay to short-delay interconnect links and adding a short, fixed time delay to long-delay interconnect links. Once set, however, the fixed delays remain constant even though the interconnect links' related RF or phone-line equipment may in fact change due to aging or outright substitution. As a result, a technician capable of realigning the equipment must be dispatched to diagnose and re-adjust the appropriate fixed delay to bring the disturbed interconnect link back into time synchronization. Such a maintenance process is expensive, time-consuming, and disruptive to simulcast system performance.

One known prior art system has compensated for this problem by establishing the following arrangement. An audio signal to be simulcast is sent from a control center to various remotely-sited transmitters. The control center, upon establishing interconnect links between itself and each of the simulcast transmitter sites, merely recalls the appropriate, predetermined time delay needed for signals carried over a given interconnect link. However, such an approach is ineffective for compensating varying amounts of delay caused by more than one possible interconnect link between the control center and a particular remotely-sited transmitter. Quite often, alternate links may be necessary because of inclement weather, interference, or other equipment difficulties. Such problems exist whether the interconnection link is an RF link or a phone-line link. Moreover, because such systems rely on predetermined, stored values of time delay in a memory bank located at the central controller, these systems operate in an open-loop fashion, unable to fully compensate for the amount of audio delay encountered in a new, alternate interconnect link. Such an approach, therefore, does not totally eliminate costly periodic maintenance.

Accordingly, there exists a need for an improved automatic synchronization system for simulcast systems capable of remotely adjusting the total delay to each base site transmitter such that each interconnect link is effectively compensated in a closed-loop fashion to automatically provide a uniform,› time-synchronized signal.

SUMMARY OF THE INVENTION

It is an object of the present invention to provide an improved, automatic synchronization system for simulcast transmission systems providing precise time-synchronized message signals throughout a designated geographical area.

It is a further object of the present invention to provide an improved, automatic synchronization system for simulcast transmission systems having uniform time synchronization of message signals utilizing a single reference transmitter and a plurality of simulcast base stations disposed in an annular fashion referenced to the reference transmitters.

Briefly described, the present invention comprises a method and means for synchronizing a plurality of simulcast base stations. This simulcast transmission system includes a master reference transmitter. A plurality of simulcast base stations are disposed in an annular fashion, forming rings or bands around the master transmitter. The first annular band (closest to the master transmitter) is synchronized to the master transmitter. The second annular band is synchronized to the first annular band. The third annular band is synchronized to the second and so on. The synchronizing arrangement of the present invention therefore insures that any two adjacent annular bands are always synchronized with respect to each other.

Additional features, objects and advantages of the automatic synchronization system for simulcast transmission systems according to the present invention will be more clearly appreciated by the following detailed description together with the accompanying drawings.

FIG. **4*a* is a block diagram of the adjustable delay described above in conjunction with FIG. 2**.

FIG. **4*b* is a schematic diagram of the adjustable delay described above in conjunction with FIG. 4*a***.

Figure 5:
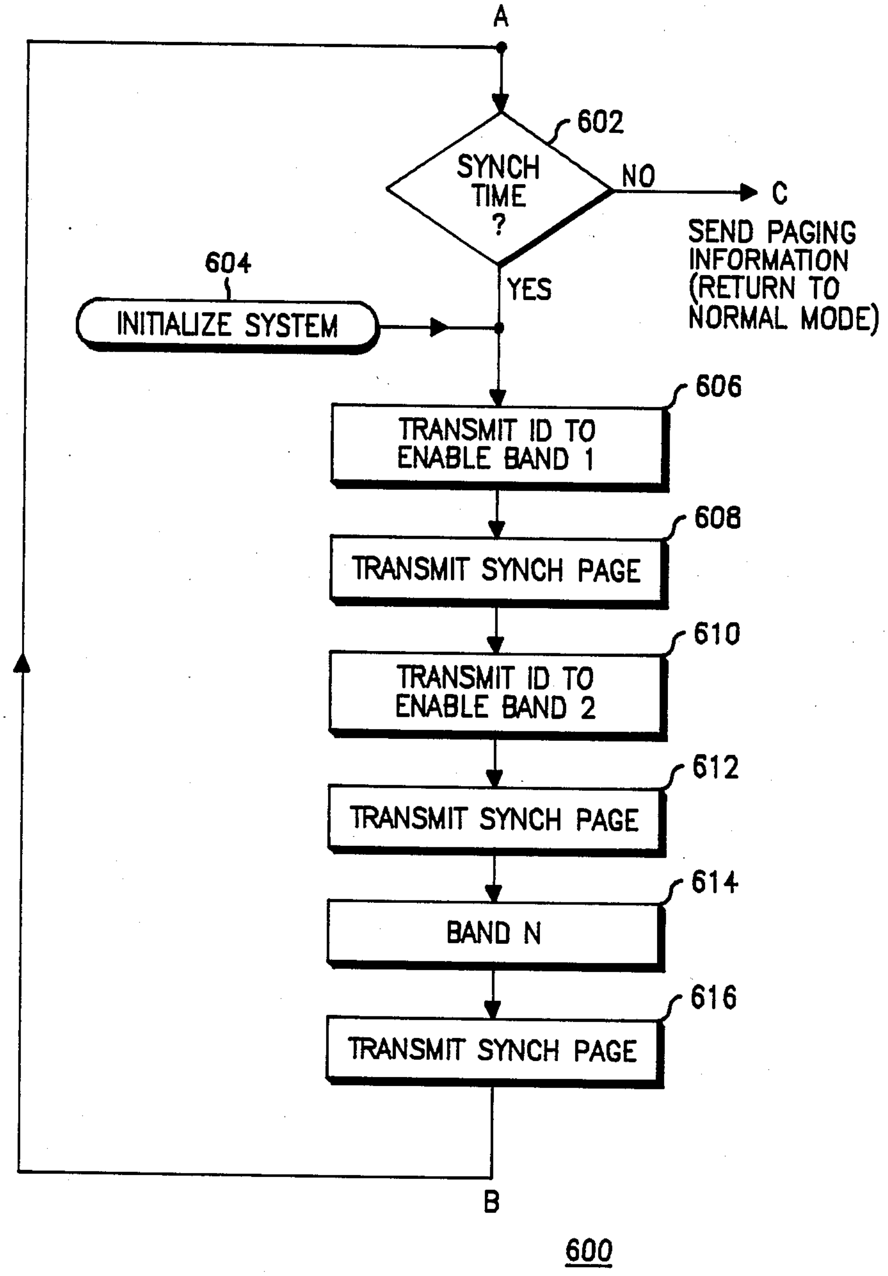

FIG. 5 is a flow diagram detailing the overall operation of the paging terminal and controller of the present invention.

FIG. 6 is flow diagram detailing the operation of synchronization algorithm of the present invention.

DETAILED DESCRIPTION OF THE DRAWINGS

Figure 1:
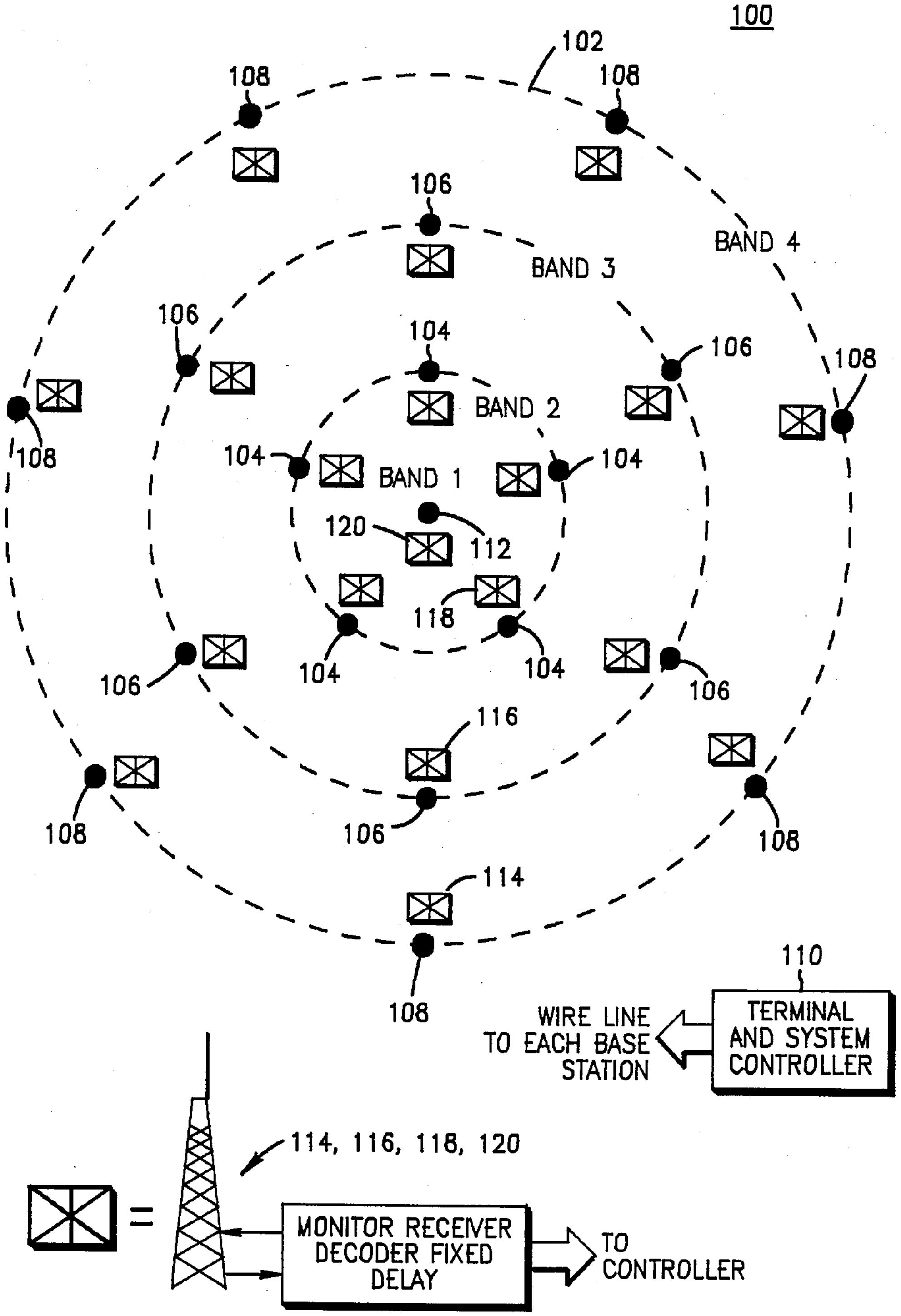
FIG. 1 is a geographic diagram of a simulcat transmission system that may advantageously utilize the present invention.

FIG. 1 is a diagram showing geographic location of simulcast base stations in the automatic synchronization system of the present invention. The system provides for automatic synchronization of the information signals sent to a plurality of paging base stations, using a periodically recurring synchronization signal which is broadcast from a central RF transmitter and subsequently broadcast from selected base stations until all base stations in the system have been synchronized.

The automatic synchronization system of the present invention is centered around the operation of a single base station transmitter 112 which is designated "band 1". The band 1 base station transmitter provides a timing reference for the entire paging system. The band 1 transmitter 112 is surrounded by a plurality of simulcast paging base station transmitters which have been classified according to their geographic location. The group of base stations 104 immediately adjacent to the band 1 transmitter is designated "band 2". The band 2 base stations are surrounded by "band 3" base stations 106. "Band 4" base stations 108 surround band 3. The geographic layout can be expanded in this manner to include whatever number of simulcast base stations are required for satisfactory system operation. Each simulcast base station transmitter includes a monitor receiver apparatus and decoder circuitry which receives and interprets information received on the wireline interface. Each band of base stations 104, 106, 108, etc. is provided with a unique identification code (ID) which corresponds to the assigned "band" for the particular base station. The ID code is used to selectively disable particular base station bands under the control of a central control unit 110. The central control unit 110 includes a paging terminal which receives paging requests and generates paging signalling information. The system controller 110 also generates the signalling information used to activate the synchronization circuitry of the base station transmitters. The terminal and system controller 110 is coupled to the various simulcast base stations via a telephone wireline link. The wireline link is used to distribute audio, paging signalling, and system control information. The link could alternatively be an RF or microwave link if necessary.

The base station transmitters used to implement the synchronization system of the present invention are conventional well known paging base stations which include additional synchronization and control circuitry which is discussed in more detail below. The terminal and system controller could be constructed of a conventional paging terminal and a microprocessor based controller. A paging terminal and microprocessor based controller suitable for use with the present invention is described in Motorola Instruction Manual 68P81026C40B, entitled Metro Page 200 Automatic Radio Paging Exchange Input/Output Processor Instruction Manual (Hardware), available from Motorola Service Publications, Motorola Inc., 1303 E. Algonquin Rd, Schaumburg Il., 61096. In the context of the present invention, the operation of the microprocessor controller just described is modified to operate in accordance with the scheme defined by the flow diagrams of FIGS. 5 and 6.

According to the teachings of the present invention, synchronization is performed as follows. Initially, the terminal and system controller 110 shuts down the entire system except the band 1 transmitter. This is performed by sending to all base stations, the proper band ID code for band 1 only. An additional result of sending the band 1 ID code sequence is to enable synchronization circuitry in band 2 to act on new synchronization information which is about to be sent. The synchronization information takes the form of conventional paging information. That is, it is merely a sequence of binary ones and zeros in a unique sequence which matches code to which the synchronization circuitry in the simulcast base station transmitters (except band 1) are set. The terminal and system controller then sends the sync page. When the sync page arrives at the previously enabled band 2 base stations via the wireline link, the synchronization circuitry is readjusted in the band 2 base stations. All other bands ignore the sync page. Because the object of the synchronization scheme of the present invention is to keep all of the simulcast base station transmitter modulator inputs synchronized, a fixed delay must be added to the output of the wire path synchronization circuitry to compensate for the RF transmission delay between the band 1 transmitter and each particular band 2 monitor receiver output. This delay is primarily a function of the distance from the band 1 transmitter to the particular band 2 monitor receiver, and therefore requires that the amount of fixed delay for the wire path synchronization circuitry be set during installation. If the simulcast base station adjustable delay is providing the correct amount of delay when the sync page is sent, the timing pulse triggered via the wireline from the terminal and system controller will arrive at the sync comparator 308 at the same time as the timing pulse triggered via RF from the band 1 transmitter. If not, the synchronization circuitry determines the correct amount of adjustable delay and resets the adjustable delay accordingly.

To synchronize the next higher band (band 3), the paging terminal sends a band 2 code sequence. The result of the band 2 sequence is to turn "off" all base station transmitters except those in band 2, and to enable the synchronization circuitry in all band 3 simulcast base station transmitters to act on the new synchronization information which will follow. A new sync page will then follow. The process of resynchronization will continue until all bands have been resynchronized.

Figure 2:
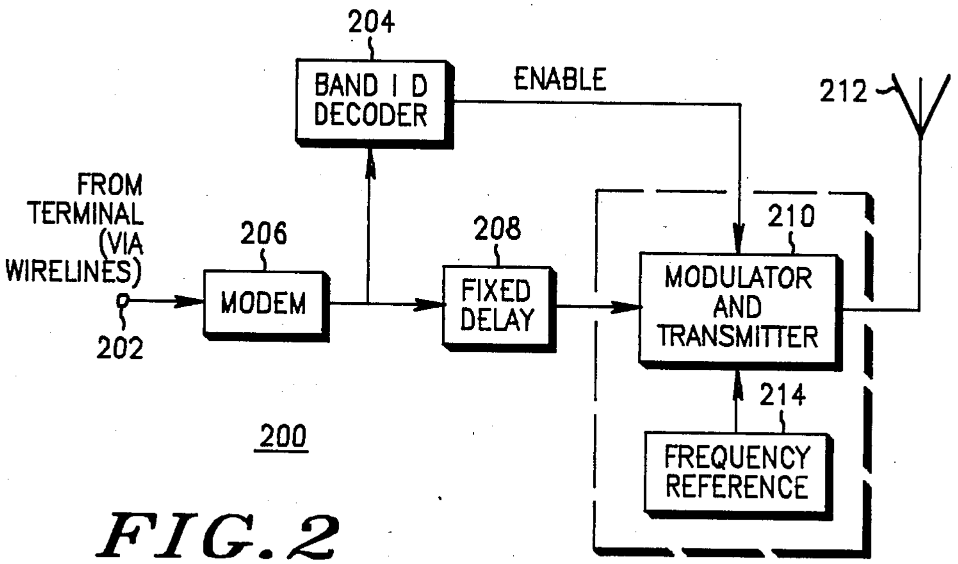
FIG. 2 is a schematic and block diagram of the configuration of the master transmitter portion of the present invention.

Referring now to FIG. 2, there is shown a block diagram detailing the structure of the band 1 base station. The band 1 base station receives an input via the wireline terminal 202 which is coupled to a modem 206. The modem 206 converts the signal received via wireline to the binary form used by the base station. The output of modem 206 is coupled to a fixed delay 208. The fixed delay 208 provides a time delay which must be sufficient to ensure that a page from the paging control terminal will arrive at the band 1 transmitter after the paging information arrives at all other base stations via the wireline network. This feature ensures that the synchronization circuitry used in the other base stations will be able to synchronize to the sync page by adding a positive delay. The output of the fixed delay 208 is applied to a modulator and transmitter 210 for transmission to the other base stations. A frequency reference 214 provides a modulator reference signal to ensure stable frequency operation. A band ID decoder 204 is also coupled to the output of modem 206. The band ID decoder monitors the information received via wireline for the ID which instructs the ID decoder to enable the modulator and transmitter. As mentioned above, this ID takes the form of a conventional page with an address that corresponds to particular base station bands. As such, the present invention is adaptable to operate with any binary paging signalling scheme, and with a slight modification, any analog paging signalling scheme. Therefore, the band ID decoder 204 may be implemented as a conventional paging decoder. An ID decoder suitable for use with the present invention is described in U.S. Pat. No. 3,855,576, entitled "Asynchronous Internally Clocked Sequential Digital Word Detector", invented by Braun et. al., May 29, 1973 and and assigned to the assignee of the present invention. Another suitable decoder is described in U.S. Pat. No. 3,801,956, entitled "Digital Sequence Detector using Multiple Samples During Each Time Period", invented by Braun et al., Mar. 12, 1973, and assigned to the assignee of the present invention. For the foregoing, the abovementioned patents are herein incorporated by reference.

The remainder of the band 1 base station may also be constructed of elements which are well known to those of ordinary skill in the art. The modem 206 may be any modem which is compatible with the industry standard Bell 212A protocol. The fixed delay 208 may be implemented as a conventional 'N' stage shift register where 'N' is determined according to the required delay. Alternatively, it may be a completely analog delay line. For example, such a delay may be an NLN6529 line equalizer, available from Motorola C & E 1303 E. Algonquin Rd. Schaumburg, Il., 60196. The modulator 210 and frequency reference 214 may be of the type described as a PURC paging base station, part no. C73JZB1101, available from Motorola C & E, at the address set forth above.

Figure 3:
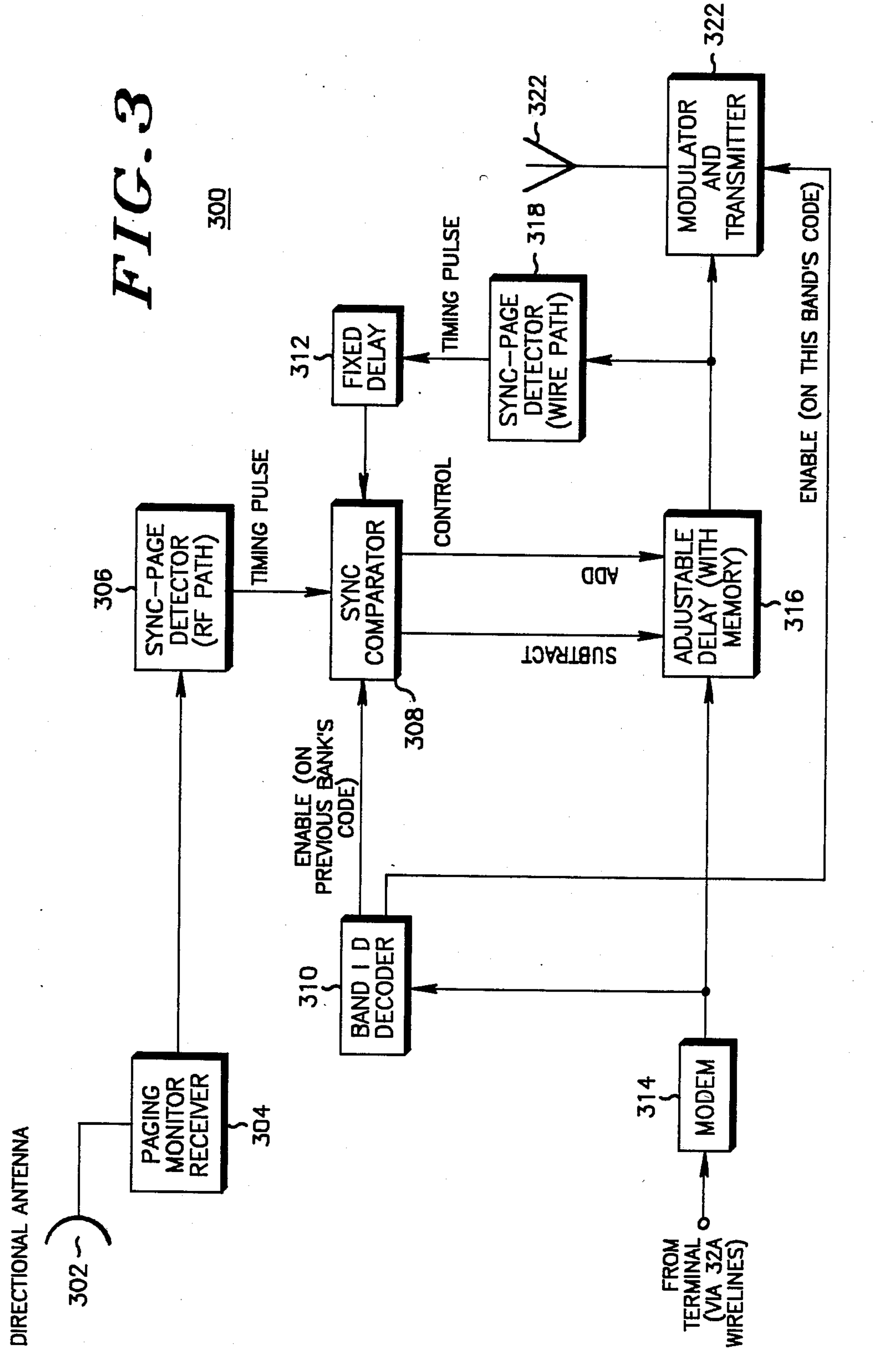
FIG. 3 is a schematic and block diagram of the remaining base station transmitters of the present invention.

Referring now to FIG. 3, a structure to implement the remaining base stations is shown in block diagram form. The band 'N' base stations receive signals through two paths. RF signals transmitted by the band 1 transmitter are received through the paging monitor receiver 304. The paging monitor receiver may be any conventional receiver designed to output a recovered data, baseband signal. A suitable monitor receiver is available from Motorola C & E, 1303 E. Algonquin Rd. Schaumburg, Il. 60196, in the form of a C6-64 option to the PURC paging base station mentioned above. The monitor receiver 304 and the PURC paging base station is described in detail in Motorola instruction manual No. 68P8060E70, entitled "Purc Radio Paging Stations Control and Application" and manual No 68P81013E65, entitled "Micor Compa-Station Base Radio Remote Control". The above mentioned manuals are available from Motorola C & E, Service Publications Department, 1303 E. Algonquin Rd. Schaumburg, Il. 60196. The recovered data baseband signal is then processed by a sync-page detector 306. The sync-page detector 306 outputs a timing pulse whenever it detects the sync-page pattern. Although slightly different in function, the sync-page detector 306 is identical in structure to the band ID decoder 204 of FIG. 2.

A second input to the band 'N' base station is via wireline input terminal 324. The signal present on wireline terminal 324 is processed by modem 314 which recovers the digital signal. This signal is used for simulcast retransmission by modulator and transmitter 320 as well as for synchronization. The digital output of modem 314 is coupled to an adjustable delay network 316. The adjustable delay network compensates the timing of the digital baseband to be in phase with the signal received via the RF link. The compensated signal is then transmitted by modulator and transmitter 322. The adjustable delay 316 is controlled by a sync comparator 308 which is enabled by a band ID decoder 310. The band ID decoder 310 examines the digital output of modem 314 and produces a re-sync enabling output signal whenever the band (N−1) ID code is detected. The band ID decoder 310 also enables the modulator and transmitter 332 whenever the band (N) ID code has been detected. Therefore, a re-synchronization of the band N base station only occurs when the band (N−1) ID code has been detected.

The sync comparator 308 produces a correcting control signal based on the comparison between the signal received via the RF link and the signal recovered from the wireline link. The signal recovered from the wireline link is examined by the sync-page detector 318 which produces an output pulse whenever the sync-page is detected. It is identical in structure to sync-page detector 306. The output of sync-page detector 318 is coupled to the sync comparator 308 through the fixed delay 312. The fixed delay 312 compensates the timing pulse output of the sync-page detector 318, the RF transmission delay between each band N receiver and the band N−1 transmitter at which each band N monitor receiver's directional antenna is aimed. The fixed delay 312 at each site must be set during installation, as described previously. The sync comparator 308 then compares the two timing pulses and produces a control signal which increases or decreases the delay generated by the adjustable delay 316.

Figure 4A:
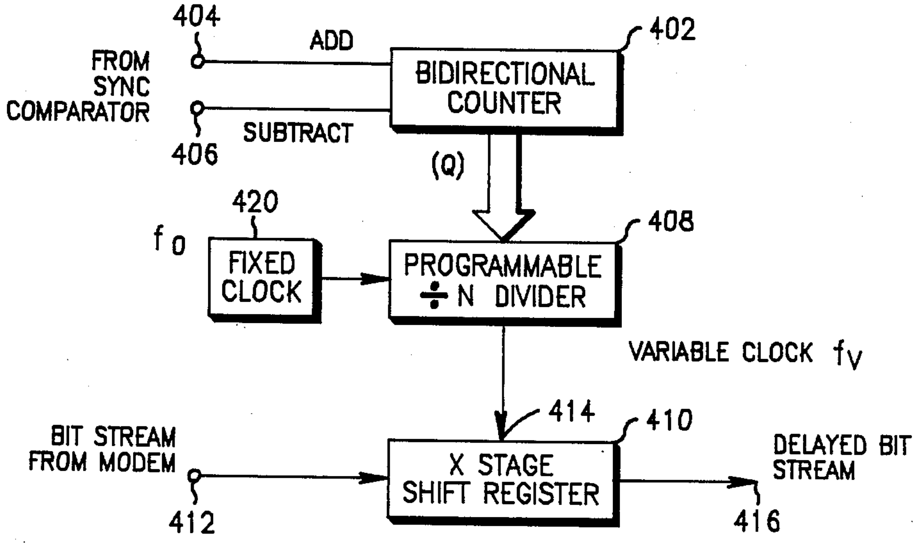

FIG. 4a is a schematic diagram of the adjustable delay network 316 of FIG. 3. The data input 412 to the adjustable delay network 316 is the digital output of modem 314 of FIG. 3. This signal comprises the digital baseband signal to be delay compensated. The signal present at terminal 412 is processed by an 'X' state shift register 410 to produce a delayed bit stream at terminal 416. The propagation delay generated by the 'X' stage shift register 410 is controlled by a variable clock $f_v$ which is input at terminal 414. The variable clock signal is generated by a programmable divider 408 which produces an output clock frequency which is dependent on programmable inputs. A fixed clock 420 provides a reference clock $F_0$ for the network. The divider ratio of programmable divider 408 is controlled by a bidirectional counter 402. The count value (Q) which is output by the bidirectional counter 402 is determined by add and subtract inputs 404 and 406, respectively, which are taken from the output of the sync-comparator 308 in FIG. 2.

In operation, the sync-comparator 308 signals cause the bidirectional counter 402 to increment (add) or decrement (subtract) on the sync comparison signals. The resulting count (Q) controls the divide-by-N divider 408 to produce the variable clock ($f_v$). The variable clock applied to an 'X' stage shift register causes a delay of ($f_v$/X) to the bit stream to be applied to the modulator and transmitter 320. The variable clock $f_v$ is determined according to the following relationship:

$$f_v = f_0/Q$$

the range of the delay varies from: $f_0/X|_{a=1}$ to $f_0/NX|_{Q=N}$ where $f_0$ is the frequency of the fixed clock 420.

Figure 4B:
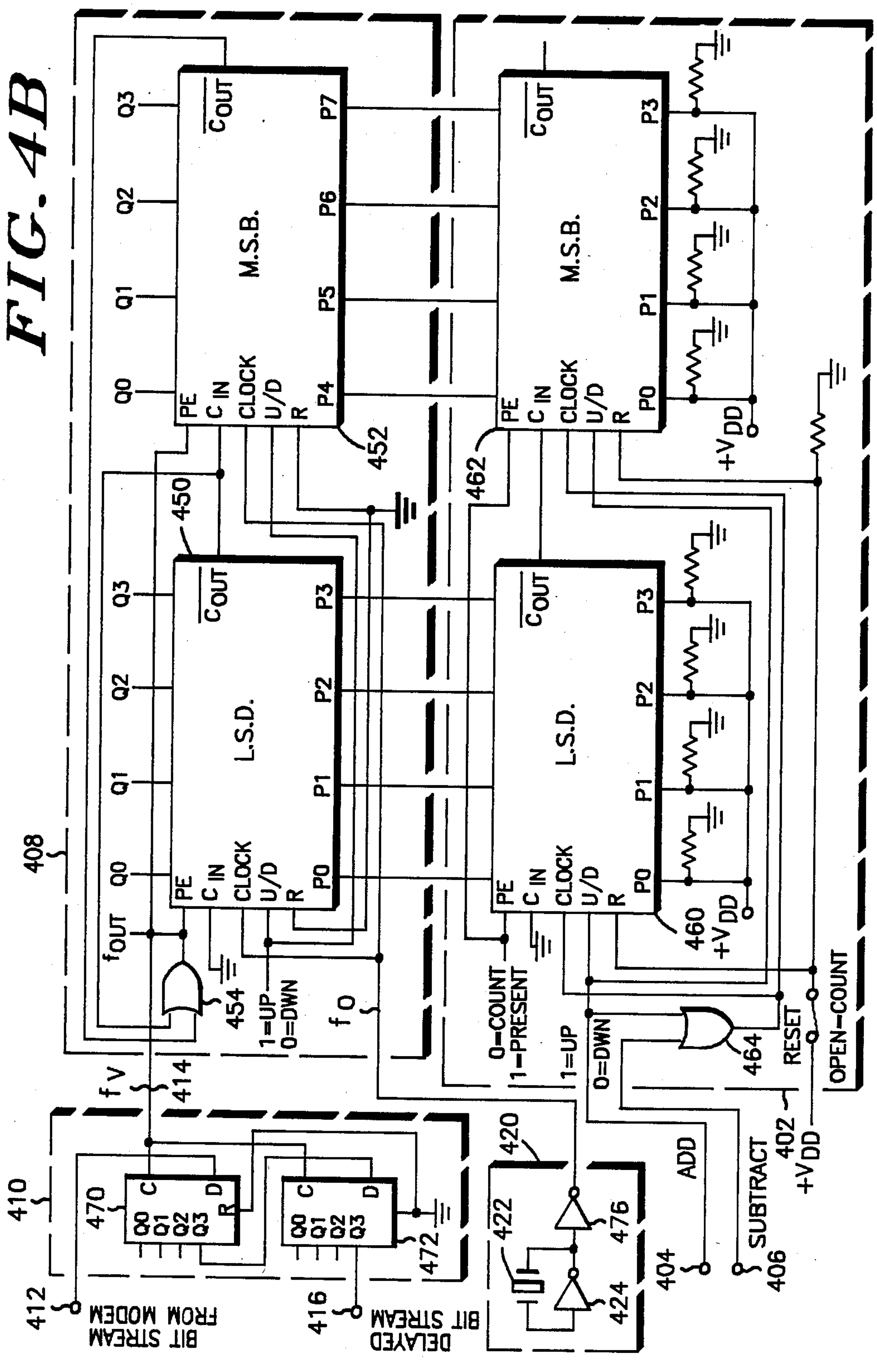

Those of ordinary skill in the art will appreciate that the adjustable delay network of the present invention can be constructed of well known components. One implementation of an adjustable delay is schematically shown in FIG. 4b. The fixed clock signal $f_0$ is generated by a crystal oscillator circuit 420 comprising a quartz crystal element 422 and two inverters 424,426. Quartz crystal elements are well known and many readily available elements could be employed. The inverters 424,426 may be MC7404 available from Motorola Semiconductor Products Inc. Box 20912, Phoenix, Ariz., 85036.

The fixed clock $f_0$ is processed by the programmable frequency divider 408 to produce the variable clock signal $f_v$ at terminal 414. In practice, the programmable frequency divider 408 may be constructed using MC14516B frequency divider integrated circuits available from Motorola Semiconductor, Inc., Box 20912, Phoenix, Ariz., 85036. The programmable frequency dividers 450 and 452 are cascaded to provide an eight bit divider. Any number of programmable frequency dividers may be cascaded to provide a wide range of divider ratios. The NOR gate 454 resets the cascaded divider once every divider period.

The eight inputs to the programmable frequency divider 408 (P0–P7) are coupled to the eight bit output of the bidirectional counter 402. The bidirectional counter is constructed of cascaded MC14516B up/-down counter integrated circuits coupled as shown in FIG. 4*b*. The add/sub input terminals 404,406 are formed by two inputs of OR gate 464. The output of OR gate 464 is coupled to counters 460,462.

The delayed bit stream at terminal 416 is generated by the 'N' stage shift register 410 formed by the cascaded MC14015 shift registers 416,470. The input 412 to the 'N' stage shift register 410 is coupled to the bit stream output by the modem 314 of FIG. 3. The clock terminal of shift registers 470 and 472 is coupled to the variable clock signal $f_v$ at terminal 414. Therefore, the adjustable delay is determined according to the frequency of the clock signal $f_v$. The specific connections required by the abovementioned devices is set forth in detail in the data information sheets which accompany the individual devices.

Referring now to FIG. 5, there is a flow diagram detailing the operation of the background routine of the paging terminal and controller described above in conjunction with FIG. 1. According to FIG. 5, item 502 is selected once during every operating cycle. Item 502 represents the normal functions of the paging terminal and controller. These functions include receiving paging requests and generating signalling corresponding to those requests. Periodically, decision 504 is selected to examine a timer. The timer indicates the elapsed time since the system was last synchronized. If the system was synchronized as recently as some predetermined time interval, for example, one hour, then the terminal and controller 110 returns to normal system operation through 506. If the predetermined time interval has elapsed, item 508 is selected to generate a wait period sufficient for any outbound messages to be completed. When the outbound messages are completed, item 510 is selected to initiate the synchronization routine. When the synchronization mode is completed at item 512, the routine 500 pauses for a small time $t_T$ to allow the system to stabilize. Item 516 then resets the periodic timer before returning to normal mode operation through 506.

Referring now to FIG. 6, there is a flow diagram detailing the operation of the terminal and controller during the automatic synchronization process of the present invention. The synchronization routine 600 is entered at 'A' whenever item 510 of FIG. 5 is selected. Decision 602 retests the sync timer to ensure that the synchronization routine 600 was properly selected. If the activation of the synchronization routine 600 was an error, decision 602 will return the terminal and controller 100 to normal operation at 'C'. If the synchronization routine 600 was properly activated, item 606 is selected to cause the paging terminal and controller 100 to transmit the ID code to enable the band 1 transmitter. Item 608 then transmits the sync page code. As mentioned above, the band ID code also enables the synchronization circuitry in the band 2 base stations. Therefore, the band 1 transmitter transmits the sync page code, which is locked to by the band 2 base stations. Item 610 is then selected to transmit the band 2 ID code and enable the band 3 synchronization circuitry. Item 612 then retransmits the sync page. In a similar fashion, the process is repeated until every band is synchronized as represented by items 64 and 616. At the completion of synchronization, the routine exits at 'B' to select item 512 of FIG. 5.

In summary, an automatic synchronization system for use with paging systems has been described. This simulcast transmission system includes a master reference transmitter. A plurality simulcast base station is disposed in an annular fashion, forming rings or bands around the master transmitter. The first annular band of base stations (closest to the mater transmitter) band 2, is synchronized to the master transmitter, enabling only the master transmitter and the synchronization circuitry of the band 2 base stations. The second annular band (band 3) of base stations is synchronized to the first annular band. The third annular band is synchronized to the second and so on. The synchronizing arrangement of the present invention therefore ensures that any two adjacent annular bands are always synchronized with respect to each other, and that, as a logical consequence, all bands are always synchronized with one another.

Although the automatic synchronization system of the present invention fully disclosed many of the attendant advantages, it is understood that various changes and modifications not depicted herein are apparent to those of ordinary skill in the art. Therefore, even though the form of the above-described invention is merely a preferred or exemplary embodiment, further variations may be made in the form, construction, and arrangement of the parts within the system without departing from the scope of the above invention.

We claim:

1. An improved automatic synchronization system for use with simulcast transmission systems and providing a means for keeping the information signals for all simulcast transmitters substantially in phase, said system comprising:

(a) primary base station means including a transmitter means;

(b) a plurality of secondary base station means disposed in a substantially annular fashion comprised of a plurality of annular bands including an innermost annular band surrounding said primary base station means; and (c) terminal and controller means coupled to said primary and secondary base station means for generating sync-page signals and selectively activating and deactivating base station synchronization circuitry for synchronizing the plurality of base station means annular bands, wherein the innermost annular band is synchronized to said primary base station, and a remaining annular band is serially synchronized to an adjacent inner annular band.

2. The improved automatic synchronization system as recited in claim 1 wherein said primary base station means includes a transmitter for transmitting information, voice and synchronization information.

3. The improved automatic synchronization system as recited in claim 1 wherein said primary base station means includes an ID decoder for selectively activating the transmitter of said primary base station means.

4. The improved automatic synchronization system as recited in claim 1 wherein said primary base station means is coupled to said terminal and controller means via a wireline interface.

5. The improved automatic synchronization system as recited in claim 1 wherein said secondary base station means are coupled to said terminal and controller means via a wireline interface.

6. The improved automatic synchronization system as recited in claim 5 wherein said secondary base station means include monitor receiver means for receiving signals on the transmitter frequency of an adjacent inner annular band, and on the primary base station transmitter frequency in the case of the innermost annular band.

7. The improved automatic synchronization system as recited in claim 6 wherein said secondary base station means includes phase comparator means for comparing the relative phase of signals received over said wireline interface means and by said monitor receiver means.

8. The improved automatic synchronization system as recited in claim 7 wherein said secondary base station means include an adjustable delay network coupled to said phase comparator means for delaying the information or voice signal received over said wireline interface means to generate a delayed information or voice signal which is in-phase with the signal received by said monitor receiver means.

9. The improved automatic synchronization system as recited in claim 8 wherein said secondary base station means includes transmitter means for transmitting said delayed voice or information signal.

10. An improved automatic synchronization system for use with simulcast transmission systems and providing a means for keeping the information signals for adjacent simulcast transmitters substantially in phase, said system comprising:

(a) a primary base station means having decoder means for detecting the presence of an identification code, transmitter means for transmitting paging information, and means for selectively activating said transmitting means in response to detecting said identification code;

(b) a plurality of secondary base station means disposed in an annular fashion comprised of a plurality of substantially annular bands including an innermost annular band surrounding said primary base station means, said secondary base station means having a monitor receiver means, a modem means, individual decoder means for detecting the presence of a unique identification code, first and second sync-page detector means for generating an output pulse upon detecting the presence of a sync-page signal, sync-comparator means coupled to said first and second sync-page detectors for comparing the relative phase of said generated output pulses and generating a phase correction signal, adjustable delay means having an input coupled to said phase correction signal for producing a delay compensated signal, and further including transmitting means for transmitting said delay compensated signal; and (c) terminal and controller means coupled to said primary and secondary base station means for generating sync-page signals and generating identification codes to selectively activate base station synchronization circuitry for synchronizing the plurality of base station means annular bands, wherein the innermost annular band is synchronized to said primary base station, and a remaining annular band is serially synchronized to an adjacent inner annular band.

11. An improved automatic synchronization system for use with simulcast transmission systems and providing a means for keeping the information signals for adjacent simulcast transmitters substantially in phase, said system comprising:

(a) primary base station means having wireline interface means, decoder means for detecting the presence of an identification code received at said wireline input means, transmitter means for transmitting paging information received over said wireline interface means, and means for selectively activating said transmitting means in response to detecting said identification code;

(b) a plurality of secondary base station means disposed in an annular fashion comprised of a plurality of substantially annular bands including an innermost annular band surrounding said primary base station means, said secondary base station means having a monitor receiver means for receiving RF signals from the adjacent inner annular base station means, and further including wireline interface means including a modem means, individual decoder means for detecting the presence of a unique identification code received over said wireline interface means, first and said sync-page detector means coupled to said monitor receiver means and said wireline input means respectively, for generating an output pulse upon detecting the presence of a sync-page signal, sync-comparator means coupled to said first and second sync-page detectors for comparing the relative phase of said generated output pulses and generating a phase correction signal, adjustable delay means coupled to said wireline input means, having an input coupled to said phase correction signal for producing a delay compensated signal, and further including transmitting means for transmitting said delay compensated signal; and (c) terminal and controller means coupled to said primary and secondary base station means via the respective wireline interface means for generating sync-page signals and generating identification codes to selectively activate base station synchronization circuitry for synchronizing the plurality of base station means annular bands, wherein the innermost annular band is synchronized to said primary base station, and a remaining annular band is serially synchronized to the adjacent inner annular band.

12. A method of synchronizing information signals in a simulcast transmission system having a central control unit, a primary base station and a plurality of secondary base stations disposed in a plurality of substantially annular bands surrounding the primary base station, wherein said primary and secondary base stations include transmitters and synchronization circuitry and ID decoders for selectively activating base station transmitters or synchronizing circuitry, said method comprising the steps of:

(a) enabling the primary base station transmitter and the synchronization circuitry of the first annular band immediately adjacent to said primary base station, and synchronizing the base stations of said first annular band to the signal received from said primary base station;

(b) enabling the transmitters of the first annular band and the synchronization circuitry of the second annular band immediately adjacent to said first annular band, and synchronizing the base stations of said second annular band to the signal received from the transmitters of said first annular band; and (c) enabling the transmitters of a previously synchronized inner annular band and the synchronization circuitry of an adjacent outer annular band, and synchronizing the base stations of said adjacent outer annular band to the signal received from the transmitters of said synchronized inner annular band until every base station in the system has been synchronized.

* * * * *